(12) United States Patent
Jackson et al.

(10) Patent No.: US 7,620,626 B2
(45) Date of Patent: Nov. 17, 2009

(54) SYSTEM, METHOD, AND SOFTWARE FOR IDENTIFYING HISTORICALLY RELATED LEGAL OPINIONS

(75) Inventors: Peter Jackson, Burnsville, MN (US); Khalid Al-Kofahi, Rochester, NY (US)

(73) Assignee: West Services, Inc., Eagan, MN (US)

( * ) Notice: Subject to any disclaimer, the term of this patent is extended or adjusted under 35 U.S.C. 154(b) by 115 days.

(21) Appl. No.: 11/421,043

(22) Filed: May 30, 2006

(65) Prior Publication Data

US 2006/0206467 A1    Sep. 14, 2006

Related U.S. Application Data

(63) Continuation of application No. 10/117,701, filed on Apr. 4, 2002.

(60) Provisional application No. 60/281,340, filed on Apr. 4, 2001.

(51) Int. Cl.
*G06F 7/00* (2006.01)
(52) U.S. Cl. ............... 707/3; 707/5; 707/10; 704/1; 706/7
(58) Field of Classification Search .......... 707/3–6, 707/10, 100–102, 104.1; 706/12–13, 15–21, 706/45, 7; 704/1
See application file for complete search history.

(56) References Cited

U.S. PATENT DOCUMENTS 5,157,783 A    10/1992    Anderson et al.

(Continued)

FOREIGN PATENT DOCUMENTS

WO    WO-97/12334 A1    4/1997

OTHER PUBLICATIONS

"Information Extraction from Case Law and Retrieval f Prior Cases by Partial and Query Generation"—Jackson et al.—Proceedings of the 1998 ACM CIKM, ACM—1998—14 pages.*

(Continued)

*Primary Examiner*—Jean B. Fleurantin
*Assistant Examiner*—Anh Ly
(74) *Attorney, Agent, or Firm*—Schwegman, Lundberg & Woessner, P.A.

(57) ABSTRACT

The American legal system, judges and lawyers are continually researching an ever-expanding body of past judicial opinions, or case law, for the ones most relevant to resolution of new disputes. To facilitate these searches, some companies collect and publish the judicial opinions of courts across the United States in both paper and electronic forms, with some of the cases containing references to prior cases from other courts that have previously ruled on all or part of the same dispute. Identifying the prior cases is problematic, because, for example, conventional computer text-matching not only suggests too many non-prior cases, but also misses too many actual prior cases. Accordingly, the present inventors devised systems, methods, and software that generally facilitate identification of one or more documents that are related to a given document, and particularly facilitate identification of prior cases for a given case. One specific embodiment retrieves prior-case candidates based on information extracted from an input case, and then uses a support vector machine to determine which of the prior-case candidates are most probably prior cases for the input case.

28 Claims, 3 Drawing Sheets

U.S. PATENT DOCUMENTS

| | | | |
|---|---|---|---|
| 5,265,065 A | 11/1993 | Turtle | |
| 5,418,948 A | 5/1995 | Turtle | |
| 5,434,932 A | 7/1995 | Scott | |
| 5,488,725 A | 1/1996 | Turtle et al. | |
| 5,497,317 A | 3/1996 | Hawkins et al. | |
| 5,644,720 A | 7/1997 | Boll et al. | |
| 5,794,236 A * | 8/1998 | Mehrle | 707/5 |
| 5,832,494 A * | 11/1998 | Egger et al. | 707/102 |
| 5,943,669 A * | 8/1999 | Numata | 707/5 |
| 6,026,388 A * | 2/2000 | Liddy et al. | 707/1 |
| 6,128,608 A * | 10/2000 | Barnhill | 706/16 |
| 6,134,344 A | 10/2000 | Burges et al. | |
| 6,157,921 A | 12/2000 | Barnhill | |
| 6,161,130 A * | 12/2000 | Horvitz et al. | 707/5 |
| 6,192,360 B1 * | 2/2001 | Dumais et al. | 707/6 |
| 6,411,930 B1 * | 6/2002 | Burges | 704/240 |
| 6,502,081 B1 * | 12/2002 | Wiltshire et al. | 706/12 |
| 6,519,580 B1 | 2/2003 | Johnson et al. | |
| 6,662,170 B1 * | 12/2003 | Dom et al. | 706/45 |
| 6,684,202 B1 * | 1/2004 | Humphrey et al. | 706/45 |
| 6,694,315 B1 | 2/2004 | Grow | |
| 6,714,939 B2 | 3/2004 | Saldanha et al. | |
| 6,751,606 B1 * | 6/2004 | Fries et al. | 707/3 |
| 6,772,149 B1 * | 8/2004 | Morelock et al. | 707/6 |
| 6,879,944 B1 * | 4/2005 | Tipping et al. | 706/16 |
| 6,882,990 B1 * | 4/2005 | Barnhill et al. | 706/16 |
| 6,904,423 B1 * | 6/2005 | Nicolaou et al. | 706/46 |
| 6,917,708 B2 * | 7/2005 | Goodman et al. | 382/186 |
| 7,003,719 B1 * | 2/2006 | Rosenoff et al. | 715/205 |
| 7,062,498 B2 * | 6/2006 | Al-Kofahi et al. | 707/101 |
| 2002/0049602 A1 | 4/2002 | Horvitz | |
| 2002/0138529 A1 | 9/2002 | Yang-Stephens et al. | |
| 2003/0046421 A1 | 3/2003 | Horvitz et al. | |
| 2006/0248440 A1 * | 11/2006 | Rhoads et al. | 707/100 |
| 2008/0215513 A1 * | 9/2008 | Weston et al. | 706/13 |

OTHER PUBLICATIONS

"Handling Concept Drifts in Incremental Learning with Support Vector Machines"—Syed et al. ACM— 1999, pp. 317-321.*

"Automatic Recognition of Distinguishing Negative Indirect History Language in Judicial Opinions"—Conrad, Jack G. & Dabney, Daninel P.—ACM—CIKM'01, Nov. 5-10, 2001, Atlanta < Geogia (pp. 287-294).*

"Combining multiple classifiers for text categorization"—Khalid Al-Kofahi, Alex Tyrrell, Arun Vachher, Tim Travers and Peter Jackson—Conference on information and knowledge Management, Proceedings of the tenth International conference on information and knowledge management—2001-ACM (pp. 97-104).*

"Finding factors: learning to classify case opinions under abstract fact categories"—Stefanie Bruninghaus & Kevin D. Ashley—International conference on Artificial Intelligence and Law—proceedings of the 6th International conference on Artificial Intelligence and Law—1997—ACM (pp. 123-131).*

Al-Kofahi, K., et al., "Anaphora Resolution in the Extraction of Treatment History Language from Court Opinions by Partial Parsing", *Proceedings of ACM ICAIL-99*, Oslo, Norway, (1999), 138-146.

Bueno, T. C., "JurisConsulto: Retrieval in Jurisprudencial Text Bases Using Juridical Terminology", *Proceedings of the 7th International Conference on Artificial Intelligence and Law*, (1999), 147-155.

Cristianini, N., "Support Vector and Kernel Machines", http://www.support-vector.net/tutorial.html, (2001), 84 pgs.

Hopcroft, J., et al., *Introduction to Automata Theory, Languages, and Computation*, Addison-Wesley Publishing Company, (1979), 139-142.

Jackson, P., "Information Extraction from Case Law and Retrieval of Prior Cases by Partial Parsing and Query Generation", *Proceedings of the 1998 ACM CIKM: 7th International Conference on Information and Knowledge Management*, (1998), 14 pgs.

Joachims, T., "SVM$^{light}$ Support Vector Machine", http://www.cs.cornell.edu/People/tj/svm_light/, (2000), 9 pgs.

Levenshtein, V. I., "Binary Codes Capable of Correcting Deletions, Insertions, and Reversals", *Soviet Physics—Doklady*, 10(8), (1966), 707-710.

Merkl D., et al., "En Route to Data Mining in Legal Text Corpora: Clustering , Neural Computation, and International Treaties", *8th International Workshop on Database and Expert Systems Applications (DEXA '97)*, (1997), 465-470.

Scholkopf, B., et al., "Chapters 5, 11, 15 and 16", In: *Advances in Kernel Methods: Support Vector Learning*, Massachusetts Institute of Technology, (Jan. 1999), 55-67, 169-184, 255-283.

Scholkopf, B., "Statistical Learning and Kernel Methods", *Microsoft Research Limited*, http://research.microsoft.com/~bsc, Technical Report, MSR-TR-2000-23, (Feb. 29, 2000), 33 pgs.

Syed, N. A., et al., "Handling Concept Drifts in Incremental Learning with Support Vector Machines", *Proceedings of ACM KDD-99*, San Diego, CA, (1999), 317-321.

Vapnik, V. N., *Statistics for Engineering and Information Science*, Springer-Verlag, New York, NY (Dec. 1999), 123-180, 244-249, 268-299.

Jackson, P., et al., "Information Extraction From Case Law and Retrieval of Prior Cases by Partial Parsing and Query Generation", *Proceedings, Seventh International Conference on Information and Knowledge Management (CIKM '98)*, (Sep. 1998), 60-67.

U.S. Appl. No. 10/117,701 Non-Final Office Action mailed Aug. 23, 2004, 18 pgs.

U.S. Appl. No. 10/117,701, Response filed Jan. 24, 2005 to Non-Final Office Action mailed Aug. 23, 2004, 11 pgs.

U.S. Appl. No. 10/117,701, Final Office Action mailed Apr. 21, 2005, 22 pgs.

U.S. Appl. No. 10/117,701, Response filed Oct. 21, 2005 to Final Office Action mailed Apr. 21, 2005, 12 pgs.

U.S. Appl. No. 10/117,701, Non-Final Office Action mailed Aug. 8, 2006, 12 pgs.

U.S. Appl. No. 10/117,701, Response filed Dec. 8, 2006 to Non-Final Office Action mailed Aug. 8, 2006, 9 pgs.

U.S. Appl. No. 10/117,701, Non-Final Office Action mailed Jan. 16, 2007, 5 pgs.

U.S. Appl. No. 10/117,701, Response filed Jul. 16, 2007 to Non-Final Office Action mailed Jan. 16, 2007, 7 pgs.

U.S. Appl. No. 10/117,701, Final Office Action mailed Oct. 9, 2007, 14 pgs.

U.S. Appl. No. 10/117,701, Response filed Apr. 9, 2008 to Final Office Action mailed Oct. 9, 2007, 9 pgs.

U.S. Appl. No. 10/117,701, Non-Final Office Action mailed Dec. 10, 2008, 16 pgs.

U.S. Appl. No. 10/117,701, Response filed Mar. 10, 2009 to Non-Final Office Action mailed Dec. 10, 2008, 9 pgs.

* cited by examiner

SYSTEM, METHOD, AND SOFTWARE FOR IDENTIFYING HISTORICALLY RELATED LEGAL OPINIONS

RELATED APPLICATION

This application is a continuation of U.S. patent application Ser. No. 10/117,701, filed on Apr. 4, 2002, which claims priority to U.S. Provisional Application 60/281,340, which was filed on Apr. 4, 2001, all of which are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2001, West Group.

TECHNICAL FIELD

The present invention concerns systems, methods, and software for identifying and associating documents relevant to an input document, especially judicial decisions that are related by case history to other judicial decisions.

BACKGROUND

The American legal system, as well as some other legal systems around the world, relies heavily on written judicial opinions—the written pronouncements of judges—to articulate or interpret the laws governing resolution of disputes. Each judicial opinion is not only important to resolving a particular legal dispute, but also to resolving similar disputes, or cases, in the future. Because of this judges and lawyers within our legal system are continually researching an ever-expanding body of past opinions, or case law, for the ones most relevant to resolution of new disputes.

To facilitate these searches, companies, such as West Publishing Company of St. Paul, Minn. (doing business as West Group), collect and publish the judicial opinions of courts across the United States in both paper and electronic forms. Many of these opinions are published with bibliographic cites or hyperlinks to historically related opinions, known as prior cases, from other courts that have previously ruled on all or part of the same dispute. The cites and hyperlinks enable researchers to find printed volumes containing the related opinions or readily access the related opinions electronically over a computer network. For example, an opinion in a patent case from the United States Supreme Court, the highest court in the United States, would generally cite not only an opinion from the Court of Appeals for the Federal Circuit, the next highest court for patent cases, but also an opinion of a local Federal District Court where the patent case started, thus documenting the history or progression of the case through the U.S. federal judicial system.

Although it may seem a simple matter to identify the prior cases for any given case, the reality is that identifying these cases is problematic for at least three reasons. First, the vast majority of opinions (about 90%) as originally written do not explicitly identify their prior cases, in part because some prior cases are only published after the opinions that should cite them were published. Second, there are no straightforward rules based on the court titles to determine even when to look for prior cases, since appellate courts—courts that review the decisions of other courts—sometimes hear new cases, and trial courts—courts that hear new cases—sometimes re-decide old cases that have been remanded (sent back) from appellate courts. And third, even when one knows to look for a prior case, the conventional technique of computer-based text-matching (that is, searching existing opinions for those with court dockets, case title, and party names that match those in a given case) not only suggests too many non-prior cases, but also misses too many actual prior cases, creating additional work for human reviewers without necessarily improving accuracy.

Accordingly, the present inventors have recognized a need for new tools and methods to facilitate identification of historically related cases, and potentially other types of related documents.

SUMMARY OF EXEMPLARY EMBODIMENT(S)

To address this and other needs, the present inventors devised systems, methods, and software that generally facilitate identification of one or more documents that are related to a given document, and particularly facilitate identification of prior cases for a given case. One specific embodiment extracts case information, such as party names, courts, dates, docket numbers, and history language, from an input case, retrieves and ranks a set of candidate cases based on the extracted party information, and compares one or more of the ranked cases to the input case using a support vector machine. The support vector machine—more generally, a kernel-based learning module—ultimately helps decide whether to link or recommend linking of the input case and one or more of the ranked cases.

DETAILED DESCRIPTION OF EXEMPLARY EMBODIMENTS

This description, which references and incorporates the above-identified Figures, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

The description includes many terms with meanings derived from their usage in the art or from their use within the context of the description. However, as a further aid, the following exemplary definitions are presented.

The term "document" refers to any addressable collection or arrangement of machine-readable data.

The term "database" includes any logical collection or arrangement of documents.

The term "case" refers to a legal dispute or proceeding and/or one or more associated documents, such as a judicial opinion.

The term "prior case" refers to a legal dispute or proceeding and/or one or more documents that are procedurally or historically related to one or more subsequent cases or associated documents.

Exemplary Document-Retrieval-and-Linking System

Figure 1:
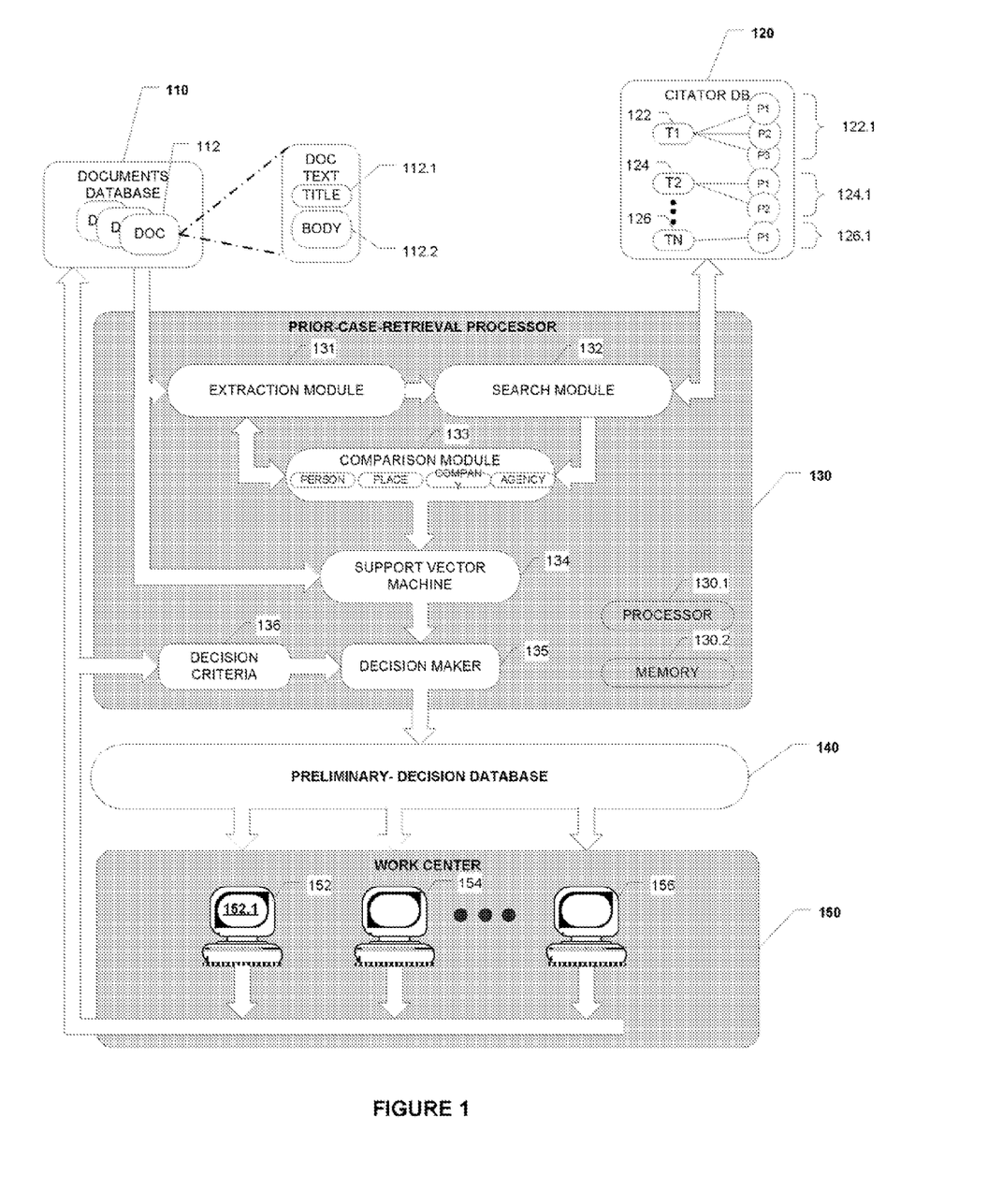
FIG. 1 is a diagram of an exemplary document-retrieval-and-linking system 100 embodying teachings of the invention.

FIG. 1 shows a diagram of an exemplary document-retrieval-and-linking system 100 for automatically retrieving and linking (or suggesting linkage) of electronic documents, such as a given case and one or more prior cases. However, the present invention is not limited to any particular type of documents.

Though the exemplary system is presented as an interconnected ensemble of separate components, some other embodiments implement their functionality using a greater or lesser number of components. Moreover, some embodiments intercouple one or more the components through wired or wireless local- or wide-area networks. Some embodiments implement one or more portions of system 100 using one or more mainframe computers or servers.) Thus, the present invention is not limited to any particular functional partition.

System 100 includes a document database 110, a citator database 120, and a prior-case-retrieval processor 130, a preliminary-decision database 140, and work center 150.

Document database 110 includes a collection of cases 112 or other documents related to legal disputes. Each case 112 includes a title and a body, such as title 112.1 and body 112.2. In the exemplary embodiment, database 110 includes new, that is, recently published cases from a larger collection of cases in a main database (not shown). However, in other embodiments, the main database or multiple databases are used.

Citator database 120 includes approximately seven million index records, such as representative index records 122, 124, and 126, for a set of existing cases in a main database (not shown). Each index record includes one or more indices, with some index based on a particular entity (person or entity) identified in the title of a case in the main database and other indices based on dates, jurisdiction, court name or identifier, and docket numbers. Some embodiments user other information from the document. Index record 122 includes indices 122.1; index record 124 includes indices 124.1; and index record 126 includes indices 126.1.

In the exemplary embodiment, each record has up to eight indices for its associated case. The party-based indices result from parsing the titles of each case, extracting party entities from each parsed title, and assigning indices to each extracted party entity. Each party entity has its own set of indexing terms. For example, the entity "David E. Smith" has the indexing terms "Smith" and "David+Smith." The generated terms are collated and their document frequencies (that is, the number of titles a term appears in) are computed and associated with the indices. Notably, smaller document frequencies suggest greater discriminating power of the term. If a case title contains more than eight person entities, the exemplary embodiment only indexes their last names because within a case, last name is a more likely reference than a first name. Table 1 below shows some sample titles and their associated index terms.

| Case Title | Index Terms |
|---|---|
| *City of Portland* v. *Montgomery* | portland<br>montgome |

-continued

| Case Title | Index Terms |
|---|---|
| *Hoffman Plastic Compounds, Inc.* v. *National Labor Relations Board* | hoffman + compound<br>hoffman + plastic<br>plastic + compound<br>compound<br>plastic<br>hoffman<br>nlrb |
| *Arizona Corporation Commission* v. *Superior Court of Maricopa County* | Court + maricopa<br>az + comn<br>maricopa + county<br>maricopa<br>superior + court<br>az<br>superior<br>court |
| *Ritchie Grocery* v. *Sherry K. Glass* | Sherry + glass<br>ritchie + grocery<br>ritchie<br>grocery<br>glass |
| *Belcher (Carol)* v. *T. Rowe Price Foundation, Inc.* | Carol + belcher<br>price + foundati<br>t + rowe<br>t + price<br>rowe + price<br>rowe<br>foundati<br>price |
| *Carolyn J. Gibbs* v. *Ashley C. Gibbs, a Minor Child, Andrew F. Gibbs, a Minor Child* v. *General American Life Insurance Company* | Ashley + gibbs<br>carolyn + gibbs<br>andrew + gibbs<br>general + american<br>american + life<br>american<br>general |

Coupled to both databases 110 and 120 is prior-case-retrieval processor 130. Prior-case-retrieval processor 130 includes, in addition to conventional processors 130.1 and memory 130.2 (shown in lower right corner), various software and data components which can take a variety of forms, such as coded instructions or data on an electrical, magnetic, optical, and/or magnetic carrier medium. Arranged in the figure to show an exemplary software architecture, these components include a extraction module 131, a search module 132, a comparison module 133, a support vector machine 134, a decision maker 135, and a decision-criteria module 136. Prior-case-retrieval processor 130 is also coupled to preliminary-decision database 140.

Preliminary-decision database 140 stores and/or organizes the output of prior-case-retrieval processor 130, specifically prior-case candidates and/or other related information. Within database 140, the prior-case candidates can be organized as a single first-in-first-out (FIFO) queue, as multiple FIFO queues based on single or multiple jurisdictions or subjurisdictions. The invention, however, is not limited in terms of database structure. The prior-case candidates are ultimately distributed to work center 150.

Work center 150 communicates with preliminary-decision database 140 as well as database 110 (and the main database) and ultimately assists users in updating cases to include cross references and hyperlinks between one or more of the stored prior-case candidates and particular input cases. Specifically, work center 150 includes workstations 152, 154, and 156. Workstation 152, which is substantially identical to workstations 154 and 156, includes a graphical-user interface 152.1, and user-interface devices, such as a keyboard and mouse (not shown.)

In general, exemplary system 100 operates as follows. Database 110 receives or contains a set of one or more input cases, and prior-case-retrieval processor 130 determines whether one or more of the cases within citator database 120 are sufficiently related to any of the input cases to recommend their association or linking as prior cases to the input cases. (Some other embodiments directly associate or link cases rather than providing recommendations.) The recommended cases, or more precisely citations, are stored in preliminary-decision database 140 and later retrieved by or presented to editors at work center 150 via graphical-user interfaces in workstations 152, 154, and 156 for acceptance or rejection. In some embodiments, the input case and the accepted cases are cross-hyperlinked and cross-cited, and in other embodiments a prior-case field in a data record associated with the input case is updated automatically or manually to reflect newly identified prior cases. Data on the acceptance and rejections is fed back to prior-case-retrieval processor 130 for incremental training or tuning of its decision-criteria module 136.

Figure 2:
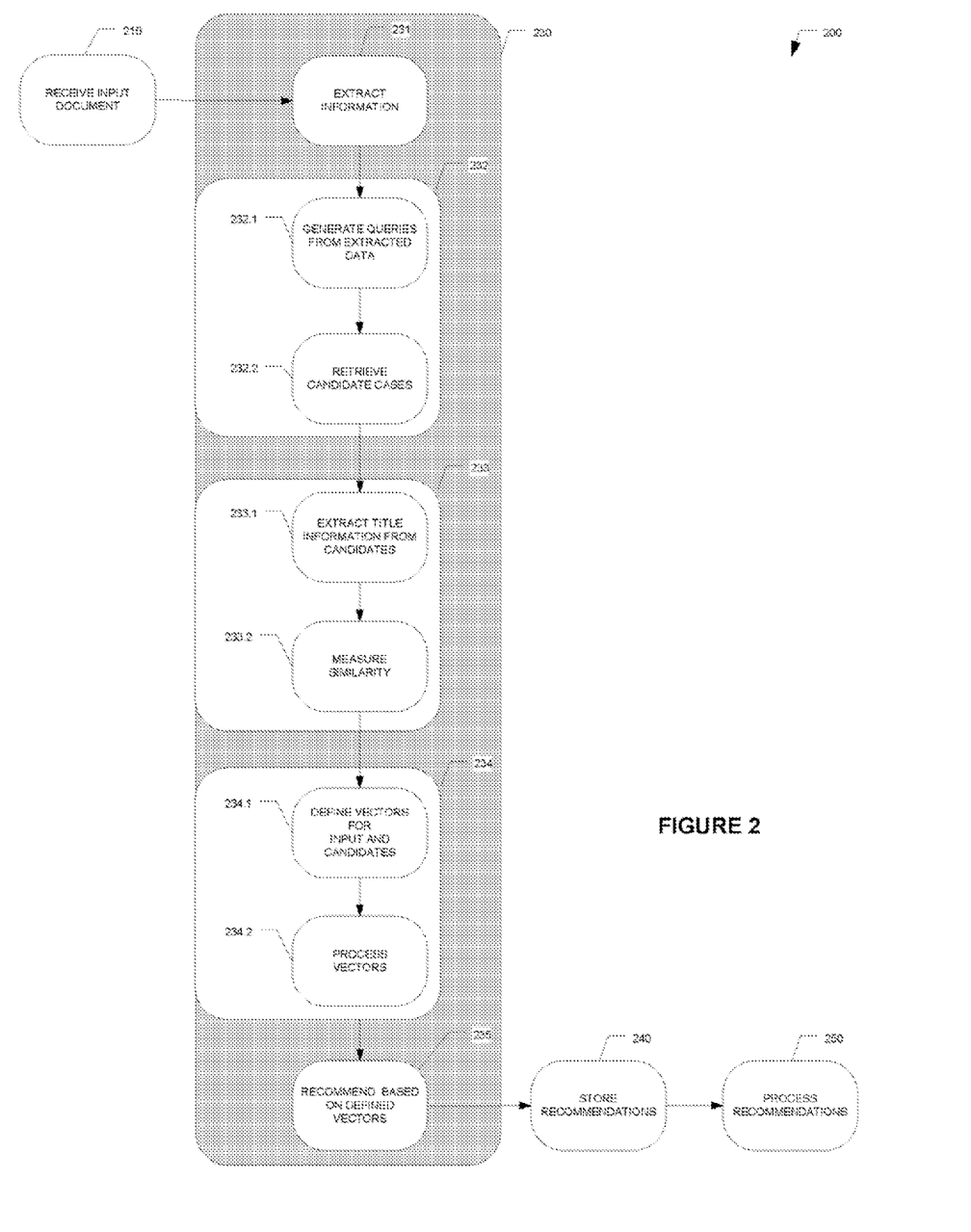
FIG. 2 is a flowchart illustrating an exemplary method embodied in system 100.

More particularly, FIG. 2 shows a flow chart 200 illustrating in greater detail an exemplary method of operating system 100. Flow chart 200 includes a number of process blocks 210, 230, 240, and 250, which parallel components in system 100. Though arranged serially in the exemplary embodiment, other embodiments may reorder the blocks, omit one or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, the exemplary process flow is applicable to software, firmware, hardware, and other types of implementations.

In block 210, the exemplary method begins by receiving or retrieving an input case (or document). In the exemplary embodiment, this entails transferring an input case from database 110 to processor 130. The input case may be a newly added case or an existing case. Exemplary execution then proceeds to block 230.

Block 230, generally representative of prior-case-retrieval processor 130, includes blocks 231-235. Block 231, representative of actions of extraction module 131, entails extracting one or more party entities from the input case. Specifically, one or more portions of the input case, such as a header containing case title, court name, and docket, are syntactically parsed to form well-formed-substring tables, using a variant of the Cocke-Younger-Kasami (CYK) parsing algorithm. (See, for example, Hopcroft and Ullman, Introduction to Automata Theory, Languages, and Computation, pp. 139-142 (1979), which is incorporated herein by reference.) The exemplary parser uses a set of conventional grammar rules and a lexicon of names, place nouns (country, state, city, town, etc.), and company words available through publicly available databases. From the well-formed-substring tables, party entities are extracted, scored, and recorded as canonical forms free of syntactic variations. In other words, different phrases representing the same entity, such as "David E. Smith" and "(Smith) David E." map to an identical data structure.

More specifically, the exemplary embodiment extracts four types of party entities: people, companies, places, and agencies, with each extracted entity assigned a weight based on its discriminatory power. The exemplary embodiment allows company parties to contain persons or places, and agency parties to contain places; person and place parties may not include other parties. The exemplary embodiment assigns each party a weight based on its discriminatory power or the amount of information it contains. The weight is defined as $$w = \frac{1}{N} \sum_{i=1}^{N} \frac{1}{\log(df_i + 1)} \quad (1)$$

where N is the number of terms in a party entity, and $df_i$ is the number of case titles of a training collection that include the i-th term. Execution then proceeds to block 232.

Block 232, which represents operation of search module 132, entails searching for prior-case candidates based the extracted information. In particular, it entails execution of process block 232.1 which generates one or more queries based on the extracted information, and execution of block 232.2 which retrieves cases from citator database 120 based on the defined queries.

In particular, block 232.1 defines or generates the queries using the party entities and other case information extracted from the input case. The indexing terms assigned to the party entities are sorted according to their document frequency, and then combined with the extracted date and court information to generate a set of structured queries. The court information includes the jurisdiction, agency, locality and circuit of the court. The input court information is used to select a set of possible prior courts according to the possible appellate chains for the instant court. The exemplary embodiments limits the search to cases decided in the past seven years.

More particularly, the exemplary embodiment generates a separate SQL query for each indexed title term extracted from the input case title. An example of SQL query for Oracle 8 (Oracle is believed to be a trademark of Oracle Corporation.) as used in the exemplary embodiment, is given below     SELECT case_number
    FROM Citator Database
    WHERE
    filed_date>add_months(trunc(to_date ('08-DEC-1999', 'DD-MON-YYYY'), 'y'), −84)
    AND index='william+polen'
    AND jurisdiction_code=39
    ORDER BY filed_date DESC;

In addition to these title-based queries, the exemplary embodiment generates a docket query for all cases in the database from a given jurisdiction and with a particular docket string. The docket string can be extracted from an appeal line in the text of the input case. The appeal line is a paragraph that indicated that that the input case is based on an appeal. One example is "This is an appeal from the district court . . . docket_string." The majority of cases lack an appeal line, and the majority of those that include one omit a docket string. The system generates other queries using the dockets of the instant court and any docket found in the appeal line. However, other embodiments can use other types of query structures and systems. (Also, some embodiments can use other types of metadata such as markup language features, headers, address information, citations, etc.)

In block 232.2, the generated queries are executed against citator database 120, which as noted earlier includes party-based index structures for a universe of existing cases that may be historically related to the input case. After results of the queries are collected, execution proceeds to block 233.

Block 233, which represents the activity of comparison module 133, entails measuring the similarity of the parties in the retrieved prior-case candidates to those extracted from the input case. In the exemplary embodiment, this similarity is measured or scored using the following objective function:

$$f = \alpha S + \beta V + \gamma C \qquad (2)$$

where the respective weighting coefficients, $\alpha$, $\beta$, and $\gamma$, are empirically selected as 0.25, 0.5, and 0.25, and components S, V, and C are defined as follows.

S, which estimates the similarity between the corresponding parties as a function of the total possible, is defined as $$S = \frac{1}{K} \sum_{k=1}^{K} \hat{s}_k \qquad (3)$$

where k (lowercase) denotes a set of parties delimited by "versus" or one of its common abbreviations "v." and "vs."; K (uppercase) denotes the total number of such sets (for example if there is one "v." then K=2, and if there are two, then K=3); and $\hat{s}_k$ denotes the score for the maximally matching party pair in the k-th set.

In measuring the similarity in the titles of an input case to the title of a prior-case candidate, the exemplary embodiment compares each party in the input case to each party in the prior-case candidate and determines a score for their similarity. The algorithm considers all possible correspondences and selects those resulting in maximum similarities, with the exception that parties from the same side of the "v." in one case are not allowed to match parties from different sides of the "v." in the second case, and vice versa when the maximum similarities are selected. Thus, for example, if the instant case has parties A, B, C, and D and the prior-case candidate has parties E, F, G, and H, then A is compared with E, F, G, and H to determine scores AE, AF, AG, and AH; B is compared with E, F, G, and H to determine scores BE, BF, BG, and BH; and so forth. If the maximal matching party pairs were found to be AE=0.9, BF=0.8, CG=0.95, DH =0.7, then S would be computed as S=(0.9+0.95)/2=0.925.

More precisely, the exemplary embodiment uses a specific type of matching or similarity scoring for each of the four types of party entities: person entities, place entities, company entities, and agency entities.

Person entities are scored as follows. If both entities are of the form <First, Middle Initial, Last> then all of these terms must match exactly. If the first name or the middle initial is missing, the last names must match person entities match if their last names match exactly and there is consistency between any remaining information. For example, David Smith matches Smith and would score 1.0, but David Smith would not match Mary Smith and score 0.0. Michelle Smith matches Michele Smith, but the match score of 1.0 is discounted by a predetermined amount, such as 15 or 20%, for each letter difference in the spellings, effectively implementing a fuzzy-match criteria that estimates the degree of match according to the number of letters (edits) needed to convert one word to another as a function of word length. The exemplary embodiment use the Levenshtein string-matching algorithm for this purpose. (See, for example, V. I. Levenshtein, Binary Codes Capable of Correcting Deletion, Insertions, and Reversal, Cybernetics and Control Theory, Vol. 10, pp. 707-710 (1966), which is incorporated herein by reference.) Michelle Smith also matches Michelle Smith-Johnson to accommodate last-name changes due to marriage.

Place entities match as long as there is no inconsistency. For example, Rochester matches City of Rochester and would score 1.0, but Town of Rochester does not match City of Rochester and would score 0.0. This has the effect of enforcing strict word agreement between nouns representing cities, counties, and states as well as place types, such as city.

The comparison and scoring for the third and fourth types of party entities, namely company and agency, is slightly different than person and place entities because company and agency entities may contain other party entities. If the company and agency parties do not include person or place entities or if these entities are consistent or not in conflict with each other, then the similarity between the two company (agency) entities or objects is estimated according to the edit distance between them. That is, the similarity is computed by $$s = 1 - \frac{d}{l}, \qquad (4)$$

where d denotes the edit distance between two parties measured in words, and l denotes the maximum number of words of either party. If there is inconsistency in the person or place entities, the matched is scored as 0.0.

V estimates the title coverage as given by the party correspondences (that is, does the set of party correspondences cover both sides of the "v." in both cases, and if yes, what is the degree of coverage.) Mathematically, V is defined as $$V = \prod_{k=1}^{K} \hat{s}_k \qquad (5)$$

C estimates the similarity between the titles of the instant case and a prior-case candidate using the following cosine criterion.

$$C = \cos \theta_{ij} = \frac{V_i' \cdot V_j'}{\|V_i\| \times \|V_j\|}, \qquad (6)$$

where vector $V_i$ and $V_j$ denote respective title vectors for the input case and the j-th prior-case candidate case. Each vector includes a number of components, with each component being a weight associated with a term in the respective title and defined as $$v = 1/\log(df+1), \qquad (7)$$

This component limits the effect of parse errors caused by unknown words and/or erroneous punctuation. The prime notation reflects that the dot product is based on the terms that the input vector and the prior-case candidate vector have in common.

The exemplary embodiments sets all similarities less than an empirically estimated threshold, such as 0.33, to zero. This is desirable if the overall matching score is to be used as a measure of title similarities. This definition does not favor titles with a large number of parties over those with smaller number of parties.

The party-matching module estimates the similarity between retrieved cases and the instant case, which are compared to a threshold to produce a ranked list of prior candidates. The similarity estimates are based on similarities between the corresponding case titles. (Some embodiments make prior-case recommendations or linkages based on this list, by for example, recommending or linking to an arbitrary number of the top-ranked prior-case candidates.) Exemplary execution then proceeds to block 234.

Block 234, which represents the activity of support vector machine 134, uses kernel-learning techniques to extract and process additional clues regarding a possible prior-case relationship between the input case and the prior-case candidates. Specifically, block 234 includes process blocks 234.1 and 234.1.

Block 234.1 entails defining a number of feature vectors, with each feature vector based on both the input case and its relation to one of the prior-case candidates. The exemplary embodiment defines each feature vectors using the following eight features: (1) Title Similarity, (2) History Language, (3) Docket Match, (4)Check Appeal, (5) Prior Probability, (6) Cited Case, (7) Title Weight, and (8) AP1 Search.

(1) Title Similarity is a measure of the similarity between the title of the input case and that of a respective one of the prior candidate. In the exemplary embodiment, this is the score assigned to the prior-case candidate by comparison module 133 in block 233.

(2) History Language is a binary feature indicating whether or not the input case includes direct history language, that is, procedural, dispositional, or directional language that indicates or suggests existence of a prior case. (See, for example, Peter Jackson et al., Information Extraction from Case Law and Retrieval of Prior Cases by Partial Parsing and Query Generation, Proceedings of the 1998 ACM CIKM: 7$^{th}$ International Conference on Information and Knowledge Management, pp. 60-67 (1998), which is incorporated herein by reference.) In some embodiments, the value for the binary History Language feature is determined within extraction module 131. In general, because of the difficulties of reliable determining the existence of direct history language, this feature in not dispositive of prior-case existence. Indeed, experiments suggests recall in the low 80-85% range and precision in the 50-60% range for extraction of history language.

(3) Docket Match is a binary feature indicating whether or not the instant-prior case pair has been assigned the same docket. Although one might expect courts to use the same dockets throughout an appeal process for a given case, statistics suggest that only 19.5% of prior-case pairs (pairs of cases that have a prior-case relationship with each other) in the database are assigned the same dockets. Moreover, even when the same court is hearing both the instant and the prior cases, the statistics suggest that the same docket number is used only 57% of the time. Indeed, only 29% of the 1.3 million cases within an appellate chain in the database are considered by the same court.

(4) Check Appeal is an estimate of the probability of the prior court for the respective candidate case given the instant court. In one sense, this feature effectively models the appellate chain as a Markov chain, with the courts being the different states and the Check Appeal estimates representing the conditional transitional probabilities from state to state. For some courts, statistics suggest that 90% or more of their prior cases originate from a particular court, and the remaining 10% originate from a limited set of other courts. The exemplary embodiment computes this conditional probability according to $$P(\text{prior court is } pc \mid \text{instant court is } ic) = \left(\frac{\|pc\|}{\|ic\|}\right)\left(1 - \frac{1}{\sqrt{\|ic\|}} + 0.1\right) \quad (8)$$

where pc denotes the court of a prior candidate; ic denotes the instant or input court (that is, the court hearing the input case); ‖ic‖ denote the number of cases in the instant court that have priors; and ‖pc‖ denote the number of cases in the instant court with priors coming from the prior court pc. The second term is a scaling factor that reflects a level of confidence in the estimated probability, particularly when the estimates are based on small sample sets.

(5) Prior Probability estimates the probability that the instant case has a prior case. From the outset, this can be viewed as the ratio of cases with priors to the total number of cases reported in the database. However, such a ratio can be corrected further by noticing that the probability of having a prior is a function of the instant court. Intuitively, if the instant case is in a court of last resort (such as, a state supreme court or US Supreme Court), then it is highly probable that it has a prior case. Statistics suggest that such probability has a jurisdictional dependence. For example, only 1.1% of cases considered by the Supreme Court of New Hampshire have prior cases in our database, while 94.3% of the cases considered by the Florida Supreme Court have prior cases in our database. This might be partially due to the fact that we do not keep track of all cases in all state jurisdictions. The exemplary embodiment estimates the prior probabilities using $$P(\text{instant case has prior} \mid \text{instant court}) = \left(\frac{c}{C}\right)\left(1 - \frac{1}{\sqrt{C}} + 0.1\right) \quad (9)$$

where C(uppercase) denotes the number of cases heard in the instant court, and c (lowercase) denotes the number of cases within C that have prior cases. Again, the second factor is a scaling factor adjustment for confidence.

(6) Cited Case is a binary feature indicating whether or not the prior case candidate is cited in the instant case.

(7) Title Weight estimates the discriminatory power of terms in the input case title. This feature is used to discriminate between a complete title match on more common term, such as "Smith," and a complete title match on a less frequent term, such as "Alex J. Tyrrell." The exemplary embodiment computes Title Weight using equation (1), which for convenience is repeated below:

$$w = \frac{1}{N}\sum_{i=1}^{N}\frac{1}{\log(df_i + 1)} \quad (10)$$

where N is the number of terms in a party entity, and $df_i$ is the number of case titles of a training collection that include the i-th term. Some embodiments account for this discriminatory power in the title similarity score computed in block 233.

(8) AP1 Search is a binary feature that indicates whether or not a prior-case candidate was retrieved through a query generated from the appeal (AP1) line in the instant case. The AP1 line is a line in the text of the instant case containing information about any existing prior case. A sample AP1 line is "AP1@@ (Colbert Circuit Court, CV-96-104; Court of Civil Appeals, 2960768) $$." However, the majority of cases (about 90%) do not include such a line.

Although the exemplary embodiment uses these eight features, other embodiments uses greater or lesser numbers of features. For example, one such embodiment uses a subset of four of the eight exemplary features, such as title similarity, title weight, history language, and check appeal. Another embodiment uses a subset of these four exemplary features, such as title similarity, and history language. Thus, the present invention is not limited to any particular set of features or numbers of features.

After defining the feature vectors in block 234.1, execution continues with support vector processing in block 234.2, which uses a support vector machine (SVM) 234 to score prior-case candidates according to their likelihood of being true prior cases. (More generally, support vector machines are used to discriminate between the positive and negative examples of a given category or class.) The exemplary embodiment implements the SVM using commercially available support-vector-learning software, such as SVM Light from Thorstein Joachims of Cornell University, Ithaca, N.Y.

However, the invention is not limited to any particular kernel-learning or support-vector-learning methodology or software.

To train the SVM, the exemplary embodiment randomly selects 2100 cases from a main case database (not shown) and processes them using the pre-SVM portions of prior-case-retrieval processor 130 to accumulate up to 100 prior-case candidates per any given case. Each prior-case candidate was represented in terms of the exemplary eight-dimensional feature vector, yielding 113,000 training vectors. The SVM was trained using a linear kernel, with positive examples having five times more weight than negative examples. The training yields a hyperplane in the eight-dimensional feature space that separates more likely prior-case candidates from less likely prior-case candidates. Once trained, the feature vectors are fed into the SVM which scores them based on their "position" relative to the hyperplane, resulting in a ranked list of prior-case candidates. Execution continues at block 235.

Block 235, which represents the activity of decision-making module 135, entails suggesting or recommending one or more of the prior-case candidates, based on respective SVM scores, as probable prior cases of the instant case. In the exemplary embodiment, this entails applying two thresholds $\Gamma_1$, and $\Gamma_2$ from decision-criteria module 136. $\Gamma_1$ is an absolute threshold on the SVM score, which limits the number of instant cases that the system suggests priors for, and $\Gamma_2$ is a relative threshold based on the highest scoring prior-case candidate, which limits the number of suggestions made per input case. The exemplary embodiments sets $\Gamma_1$ and $\Gamma_2$ respectively to 4.8 and 0.7 based empirically on the scores of a tuning set of 800 unseen instant cases.

Block 240 shows that prior-case candidates with SVM scores that satisfy both threshold criteria are ultimately forwarded in association with the input case to preliminary-decision database 140. Database 140 sorts the recommendation based on jurisdiction, or other relevant criteria and stores them in, for example, a single first-in-first-out (FIFO) queue or in multiple FIFO queues. The exemplary method then continues at block 235.

Block 250, which represents the activity of work center 150, entails accepting or rejecting one or more of the prior-case candidates from database 140. Specifically, one or more of the prior-case candidates are communicated by request or automatically to work center 150, specifically workstations 152, 154, and 156. Each of the workstations displays, automatically or in response to user activation, one or more graphical-user interfaces, such as graphical-user interface 152.1.

Figure 3:
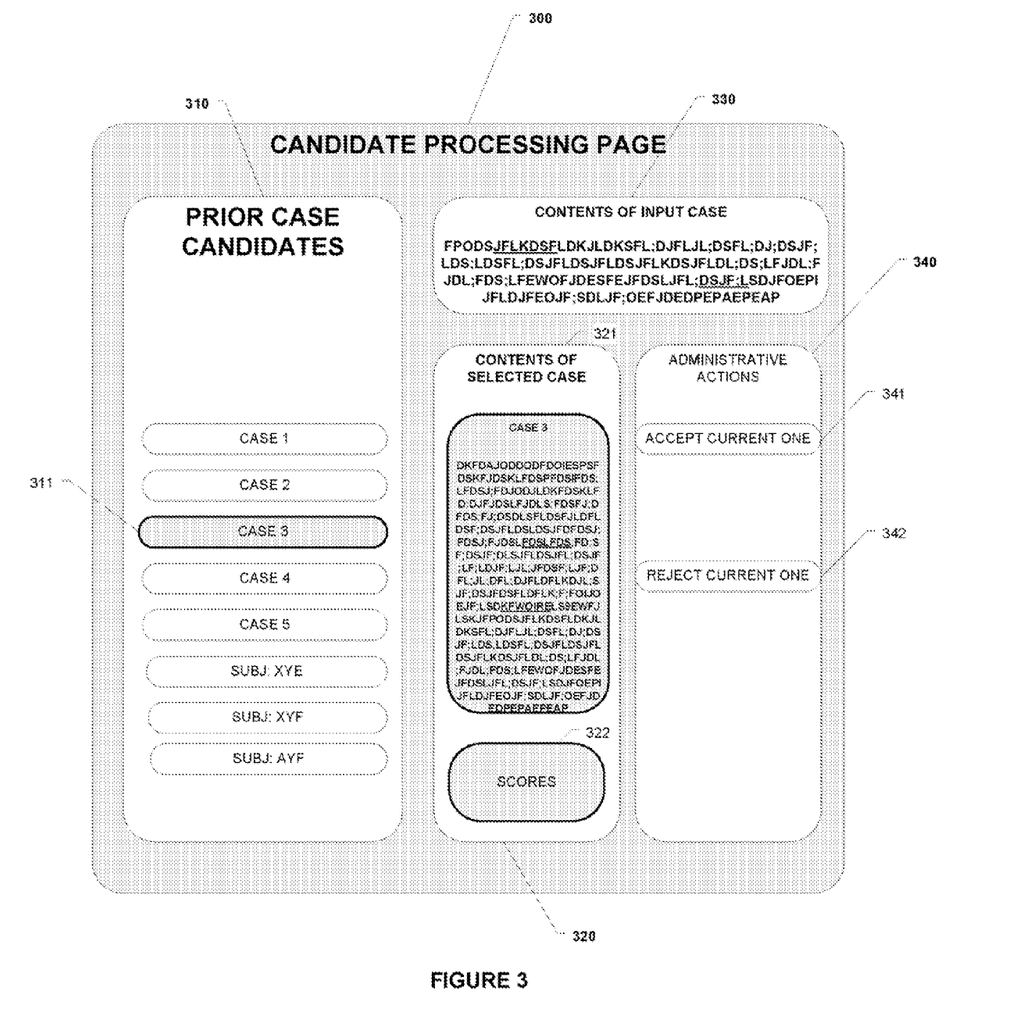
FIG. 3 is a facsimile of an exemplary graphical user interface 300 that forms a portion of system 100.

FIG. 3 shows an exemplary form of graphical-user interface 152.1. Interface 152.1, which may be deployed as webpage or other functionally similar device, includes concurrently displayed windows or regions 310, 320, 330, and 340. Region 310 includes a list of case or selectable document identifiers, such as an identifier 211, with each identifier corresponding to one prior-case candidate that satisfies the decision-making criteria of module 136. Selection of an identifier changes in appearance and causes display of associated information in region 320.

Specifically, region 320 includes regions 321 and 322. Region 321 displays text of the selected case, with any history language visibly highlighted relative to other portions of the text. Region 322 displays various scores and other information generated and/or used by prior-case-retrieval processor 130 in making its decision to recommend the selected case as a prior-case candidate.

Region 330 displays text of the input case associated with prior-case candidates, with any history language visibly highlighted relative to other portions of the text. The exemplary embodiment highlights this language using underlining and/or reverse-video display. Region 330 also includes scrolling features (not shown.)

Region 340 includes selectable command inputs 331 and 332. Selection of input 331 accepts the selected case for linkage with the input case, and selection of input 332 rejects the selected case. Acceptance in some embodiments invokes an additional screen or dialog window, allowing a user to enter text directly into a history field associated with the input case.

FIG. 2 shows that after processing of the recommendations, execution of the exemplary method continues at block 260 with update of the recommendation decision criteria. In the exemplary embodiment, this entails counting the numbers of accepted and rejected recommendations, and adjusting one or more decision thresholds appropriately. For example, if 80% of the recommendations for a given jurisdiction are rejected during one day, week, month, quarter or year, the exemplary embodiment may increase a generic thresholds or thresholds associated with that jurisdiction to reduce the number of recommendations. Conversely, if 80% are accepted, the threshold may be lowered to ensure that a sufficient number of recommendations are being considered. Some embodiments incorporate accepted cases into the appeal probabilities for various courts on an daily, weekly, monthly, quarterly, or other temporal or event-driven basis.

Other Applications

Teachings of the present invention are expected to have other applications beyond the legal one presented here. One of these is to determine or recommend linkages between documents, such as scientific papers, that directly reference each other through citations or that are substantially related by overlapping sets of citations. Another application is as a highly refined categorical search engine. In this context, one embodiment couples support-vector machine (with appropriate interface functions) on the output of any available search engine to filter its results. Variants of this embodiment train the support-vector machine on case law concerning one or more legal topics.

CONCLUSION

In furtherance of the art, the present inventors have presented systems, methods, and software that generally facilitate identification of one or more documents that are related to a given document, and particularly facilitate identification of prior cases for a given case. One specific embodiment extracts case information, such as party names, courts, dates, docket numbers, and history language, from an input case, retrieves and ranks a set of candidate cases based on the extracted case information, compares one or more of the ranked cases to the input case using a support vector machine, ultimately linking or suggesting linking of the input case to one or more of the ranked cases.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A computerized method implemented using a processor and memory, the method comprising:
   extracting information from a first document;
   retrieving a set of one or more second documents based on the extracted information;
   identifying one or more of the set of second documents as more probably related to the first document than one or more others of the second documents using a learning machine; and
   defining a multi-dimensional feature vector for each candidate document, with a set of features including a similarity feature indicating similarity of at least a portion of the candidate legal case to a portion of the document and the multi-dimensional feature vectors using support-vector processing.

2. The method of claim 1, wherein the learning machine comprises a support vector machine.

3. The method of claim 1, wherein the documents are legal opinions.

4. The method of claim 1, wherein extracting information from the first document comprises extracting information identifying one or more persons, places, or legal entities.

5. A computerized method for retrieving documents, the method implemented using at least one processor and memory and comprising:
   searching for a set of one or more documents based on a set of one of more queries;
   identifying one or more of the set of documents as more probably related to the query than one or more of other of the documents using a learning machine; and
   defining a multi-dimensional feature vector for each candidate document, with a set of features including a similarity feature indicating similarity of at least a portion of the candidate legal case to a portion of the document and the multi-dimensional feature vectors using support-vector processing.

6. The method of claim 5, wherein the learning machine comprises a support vector machine.

7. The method of claim 5, wherein the documents are legal opinions.

8. The method of claim 5, wherein searching for a set of one or more documents based on a query, comprises:
   parsing an input document;
   defining one or more queries based results of parsing; and
   executing the one or more queries against one or more databases.

9. The method of claim 5, wherein parsing the input document comprises:
   identifying one or more parties in the document.

10. The method of claim 5, wherein identifying one or more of the documents as more probably related to the query than one or more of other of the documents using a learning machine, comprises
    defining a set of feature vectors, with each feature vector based on information related to the query and a respective one of the set of documents; and
    communicating the feature vectors to the support vector machine.

11. The method of claim 5, wherein the query is based on an input document, and each of the feature vectors is based on similarity score for one or more portions of the document and the respective one of the set of documents.

12. A computerized method for identifying related documents, the method implemented using a processor and memory and comprising:
    receiving an input document;
    searching at least one database for a set of one or more related documents based on content of the input document;
    identifying one or more of the related documents as more probably related to the input document than one or more of other of the related documents using a support vector machine; and
    defining a multi-dimensional feature vector for each candidate document, with a set of features including a similarity feature indicating similarity of at least a portion of the candidate legal case to a portion of the document and the multi-dimensional feature vectors using support-vector processing.

13. The computerized method of claim 12, wherein the input document is a judicial opinion.

14. The computerized method of claim 12, wherein searching the database for a set of one or more related documents based on content of the input document comprises:
    extracting one or more party entities from the input document; and
    searching the database based on one or more of the party entities.

15. A system comprising:
    means, including a processor and memory, for extracting information from a first document;
    means, including a processor and memory, for retrieving a set of one or more second documents based on the extracted information;
    a learning machine for identifying one or more of the set of second documents as more probably related to the first document than one or more others of the second documents; and
    means, including a processor and memory, for defining a multi-dimensional feature vector for each candidate document, with asset of features including a similarity feature indicating similarity of at least a portion of the candidate legal case to a portion of the document and the multi-dimensional feature vectors using support-vector processing.

16. The system of claim 15, wherein the learning machine comprises a support vector machine.

17. The system of claim 15, wherein the documents are legal opinions.

18. The system of claim 15, wherein the means for extracting information from the first document extracts information identifying one or more persons, places, or legal entities.

19. A computerized system for retrieving documents, comprising:
    means, including a processor and memory, for searching for a set of one or more documents based on a set of one of more queries;
    a learning machine for identifying one or more of the set of documents as more probably related to the query than one or more of other of the documents; and
    means, including a processor and memory, for defining a multi-dimensional feature vector for each candidate document, with a set of features including a similarity feature indicating similarity of at least a portion of the candidate legal case to a portion of the document and the multi-dimensional feature vectors using support-vector processing.

20. The system of claim 19, wherein the learning machine comprises a support vector machine.

21. The system of claim 19, wherein the documents are legal opinions.

22. The system of claim 19, wherein the means for searching for a set of one or more documents based on a query, comprises:
    means for parsing an input document;
    means for defining one or more queries based on results of parsing; and
    means for executing the one or more queries against one or more databases.

23. The system of claim 19, wherein the means for parsing the input document comprises means for identifying one or more parties in the document.

24. The system of claim 19, further comprising means for defining a set of feature vectors, with each feature vector based on information related to the query and a respective one of the set of documents.

25. The system of claim 24, wherein the query is based on an input document, and each of the feature vectors is based on similarity score for one or more portions of the document and the respective one of the set of documents.

26. A system for identifying related documents, the method comprising:
    means, including a processor and memory, for searching at least one database for a set of one or more related documents based on content of a document;
    a support vector machine for identifying one or more of the related documents as more probably related to the input document than one or more of other of the related documents; and
    means, including a processor and memory, for defining a multi-dimensional feature vector for each candidate document, with a set of features including a similarity feature indicating similarity of at least a portion of the candidate legal case to a portion of the document and the multi-dimensional feature vectors using support-vector processing.

27. The system of claim 26, wherein the document is a judicial opinion.

28. The system of claim 26, wherein the means for searching the database for a set of one or more related documents based on content of the document comprises:
    means for extracting one or more party entities from the input document; and
    means searching the database based on one or more of the party entities.

* * * * *